United States Patent
Kojima et al.

(10) Patent No.: US 9,969,354 B2
(45) Date of Patent: May 15, 2018

(54) LID LOCK DEVICE

(71) Applicants: KABUSHIKI KAISHA TOKAI RIKA DENKI SEISAKUSHO, Aichi (JP); TOYOTA JIDOSHA KABUSHIKI KAISHA, Aichi-ken (JP)

(72) Inventors: Koichi Kojima, Toyota (JP); Eiji Kitano, Toyota (JP); Yamato Niwa, Toyota (JP); Keigo Nishimoto, Aichi (JP); Tomohiro Inoue, Aichi (JP)

(73) Assignees: KABUSHIKI KAISHA TOKAI RIKA DENKI SEISAKUSHO, Aichi (JP); TOYOTA JIDOSHA KABUSHIKI KAISHA, Aichi-Ken (JP)

(*) Notice: Subject to any disclaimer, the term of this patent is extended or adjusted under 35 U.S.C. 154(b) by 26 days.

(21) Appl. No.: 14/900,738

(22) PCT Filed: Jun. 30, 2014

(86) PCT No.: PCT/JP2014/003476
§ 371 (c)(1),
(2) Date: Dec. 22, 2015

(87) PCT Pub. No.: WO2015/004874
PCT Pub. Date: Jan. 15, 2015

(65) Prior Publication Data
US 2016/0152209 A1   Jun. 2, 2016

(30) Foreign Application Priority Data
Jul. 12, 2013   (JP) .................................. 2013-146614

(51) Int. Cl.
*B60R 25/01* (2013.01)
*E05B 83/34* (2014.01)
(Continued)

(52) U.S. Cl.
CPC .......... *B60R 25/01* (2013.01); *B60L 11/1818* (2013.01); *B60L 11/1838* (2013.01);
(Continued)

(58) Field of Classification Search
CPC ......... B65F 1/1615; B65F 1/122; E05B 81/70
(Continued)

(56) References Cited

U.S. PATENT DOCUMENTS

2009/0033459 A1* 2/2009 Ichihara .............. B60R 25/2036
340/5.28
2009/0139991 A1 6/2009 Nakaya
(Continued)

FOREIGN PATENT DOCUMENTS

CN   102826131 A   12/2012
CN   102892638 A   1/2013
(Continued)

OTHER PUBLICATIONS

Japanease Office Action issued for Japanease Application No. JP2013146614 along with an English-language translation, dated Nov. 8, 2016.
(Continued)

*Primary Examiner* — Vernal Brown
(74) *Attorney, Agent, or Firm* — Greenblum & Bernstein, P.L.C.

(57) ABSTRACT

A lid lock device includes a push lifter which pushes a lid, a lid lock switch which detects whether the lid is pushed, a lid sensor which detects whether the lid is open or closed. A lid lock unit locks the lid when the lid is closed. A verification unit verifies an identification code transmitted from an electronic key. Under a situation in which the verification result of the verification unit indicates that the identification code has been verified and the detection result of the lid sensor indicates that the lid is closed, a control unit activates (Continued)

the lid lock unit to switch the lid between a locked state and an unlocked state when the lid lock switch detects that the closed lid has been pushed.

11 Claims, 7 Drawing Sheets

(51) Int. Cl.
*E05B 81/04* (2014.01)
*E05B 81/12* (2014.01)
*E05B 81/58* (2014.01)
*E05B 83/28* (2014.01)
*B60L 11/18* (2006.01)
*E05B 81/70* (2014.01)
*E05C 19/02* (2006.01)
*E05B 81/64* (2014.01)
*E05B 81/54* (2014.01)

(52) U.S. Cl.
CPC .............. *E05B 81/04* (2013.01); *E05B 81/12* (2013.01); *E05B 81/58* (2013.01); *E05B 83/28* (2013.01); *E05B 83/34* (2013.01); *B60L 2240/28* (2013.01); *B60L 2240/80* (2013.01); *E05B 81/54* (2013.01); *E05B 81/64* (2013.01); *E05B 81/70* (2013.01); *E05C 19/022* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
USPC ......................................................... 340/5.6
See application file for complete search history.

(56) References Cited

U.S. PATENT DOCUMENTS

| | | | |
|---|---|---|---|
| 2010/0133024 | A1 | 6/2010 | Miwa et al. |
| 2010/0194529 | A1* | 8/2010 | Yamamoto .......... B60L 11/1824 340/5.65 |
| 2012/0313382 | A1 | 12/2012 | Lee et al. |
| 2012/0319648 | A1 | 12/2012 | Ohtomo |
| 2013/0088032 | A1 | 4/2013 | Hara |
| 2013/0158744 | A1* | 6/2013 | Inoue ................. G07C 9/00309 701/2 |
| 2013/0196522 | A1 | 8/2013 | Hara |

FOREIGN PATENT DOCUMENTS

| | | |
|---|---|---|
| CN | 103081246 A | 5/2013 |
| EP | 2017112 | 1/2009 |
| JP | 2005-139671 | 6/2005 |
| JP | 2008-238895 | 10/2008 |
| JP | 2009-062027 | 3/2009 |
| JP | 2009-154788 | 7/2009 |
| JP | 2012-079503 | 4/2012 |
| JP | 2012-149410 | 8/2012 |
| KR | 100772061 B1 | 11/2007 |

OTHER PUBLICATIONS

Search Report issued for PCT/JP2014/003476, dated Dec. 11, 2014.

Chinese Office Action issued for Chinese Application No. 201480039851.5 dated Dec. 26, 2016.

* cited by examiner

Fig.4A
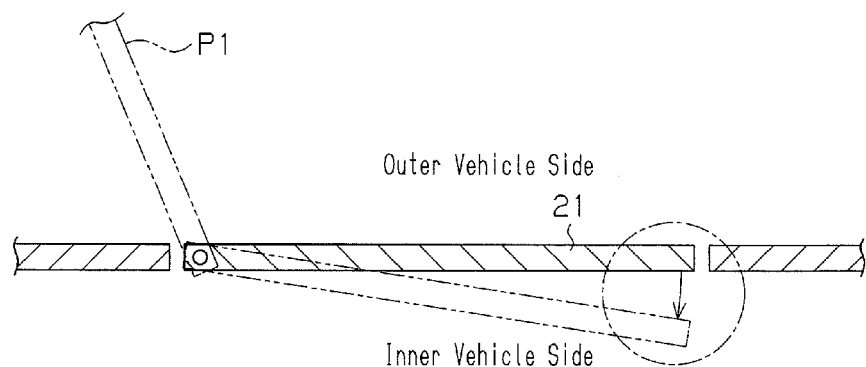
Fig.4B
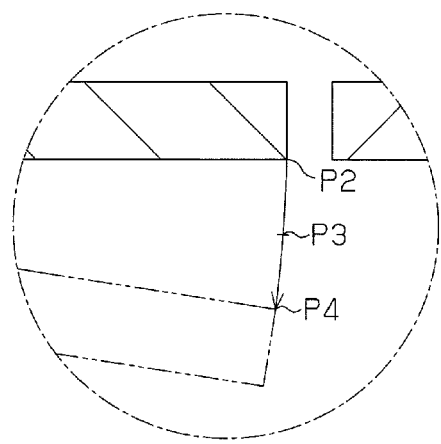
Fig.5
| | Lid Position |
|---|---|
| Outer Vehicle Side ↑ | P1 |
| | Courtesy Switching Position Pco |
| | P2 |
| | Lock Switch Switching Position Pls |
| | P3 |
| ↓ | Push Lifter Switching Position Ppl |
| Inner Vehicle Side | P4 |

Fig.9
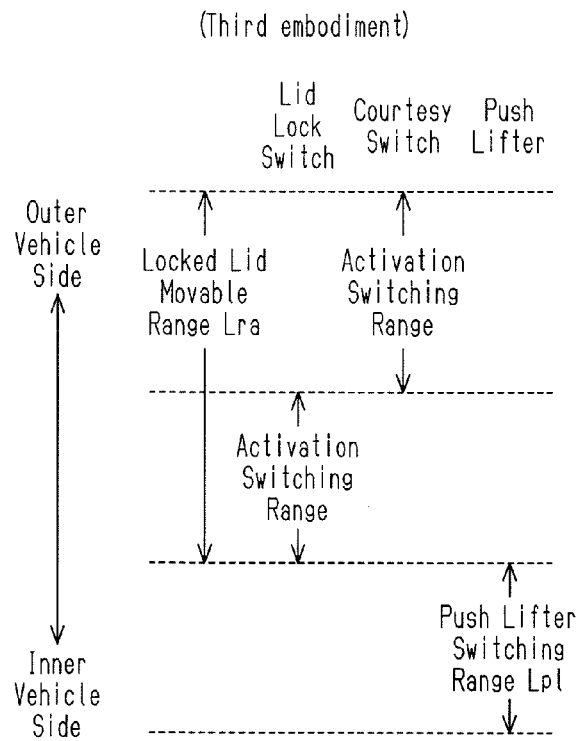
Fig.10A
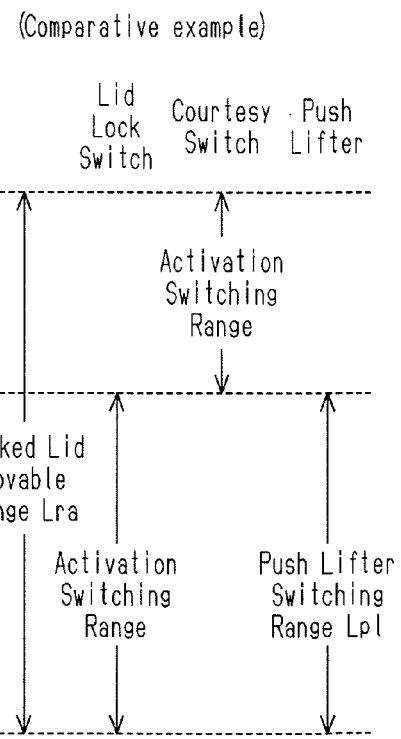
Fig.10B

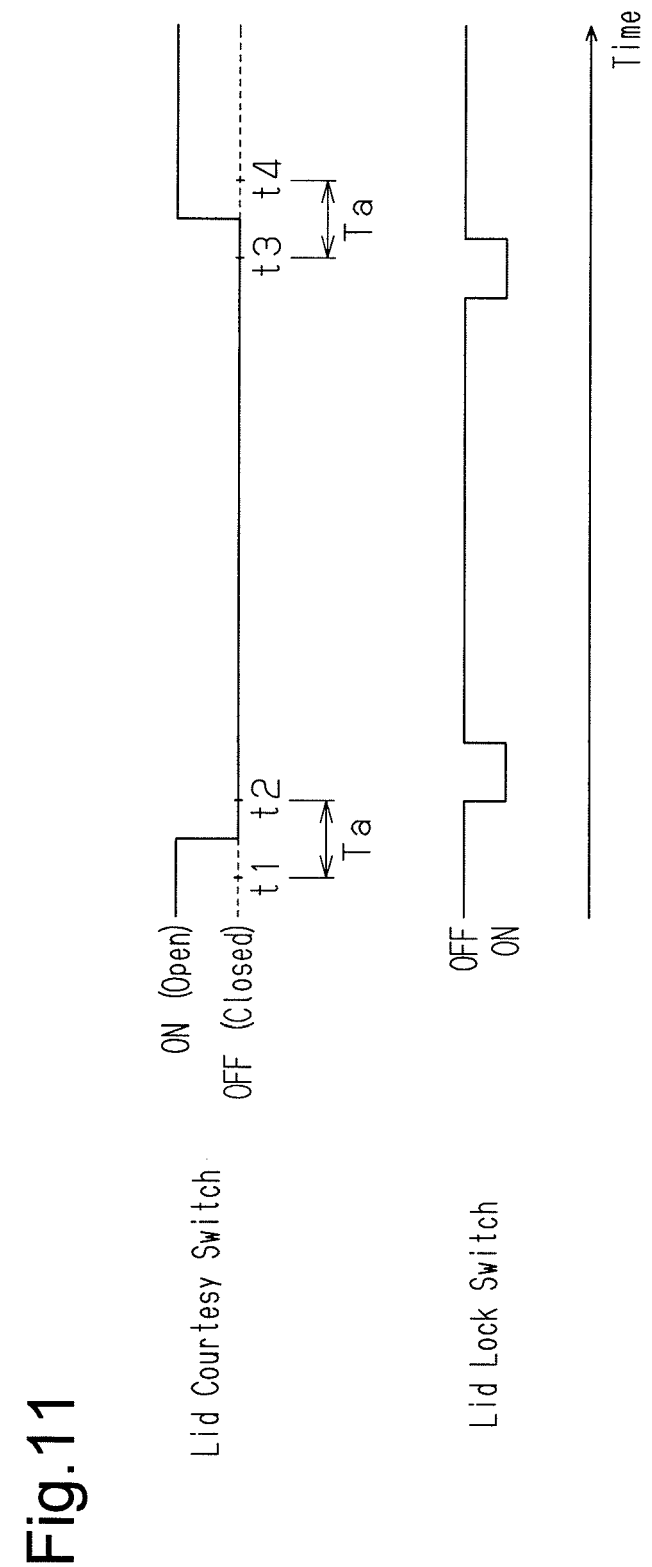

LID LOCK DEVICE

TECHNICAL FIELD

The present disclosure relates to a lid lock device.

BACKGROUND ART

A battery-powered car such as an electric vehicle or a hybrid car may be driven by the drive force of an electric motor. A battery-powered car includes a battery and an inlet. The battery drives the electric motor. The inlet is used when charging the battery and is connectable to a power plug that extends from, for example, a commercial power. The power plug that is connected to the inlet charges the battery of the battery-powered car. The battery-powered car includes a lid, which conceals the inlet, and a lid lock device, which locks and unlocks the closed lid (refer to, for example, Japanese Laid-Open Patent Publication No. 2012-149410).

SUMMARY OF THE INVENTION

The lid lock device of the '410 publication locks the lid when doors of the car are locked and unlocks the lid when the doors are unlocked. Thus, the door lock device of the '410 publication does not lock just the lid unless the doors are locked. Similarly, the door lock device of the '410 publication does not unlock just the lid unless the doors are unlocked. For example, to unlock the lid, the doors would also have to be unlocked.

It is an object of the present disclosure to provide a lid lock device that improves convenience.

One aspect of the present disclosure is a lid lock device for use with a lid that closes a port of a vehicle body. The lid lock device includes a push lifter alternately switched between a projected state and a retracted state whenever pushed by the lid. The push lifter is configured to urge the lid to an open position when switched from the retracted state to the projected state. A lid lock switch is configured to be directly or indirectly pushed by an inner surface of the lid to detect that the lid, when located at a closed position, has been pushed from an outer side. A lid sensor detects whether the lid is open or closed. A lid lock unit is controlled to lock the lid when the lid is closed. A verification unit is configured to verify an identification code transmitted through radio communication from an electronic key that serves as a portable device. A control unit is configured to control the lid lock unit in accordance with a verification result of the verification unit, a detection result of the lid sensor, and a detection result of the lid lock switch. Under a situation in which the verification result of the verification unit indicates that the identification code has been verified and the detection result of the lid sensor indicates that the lid is closed, the control unit activates the lid lock unit to switch the lid between a locked state and an unlocked state when the lid lock switch detects that the closed lid has been pushed.

This structure allows for the lid lock device to lock and unlock only the lid without cooperating with the locking and unlocking of a vehicle door. Hence, this structure provides a lid lock device that improves convenience.

Preferably, in the lid lock device, a detector switching position, a lock switch switching position, and a push lifter switching position are sequentially set from an outer side of the vehicle body. The detector switching position is set so that the detection result of the lid sensor is switched between an open state and a closed state when the lid passes by the detector switching position. The lock switch switching position is set so that the lid lock switch is pushed when the lid reaches the lock switch switching position. The push lifter switching position is set so that the push lifter is switched from a projected state to a retracted state when the lid passes by the push lifter switching position.

In this structure, when pushed into the vehicle body, the lid sequentially reaches the detector switching position, the lock switch switching position, and the push lifter switching position.

Preferably, in the lid lock device, a detector switching position, a push lifter switching position, and a lock switch switching position are sequentially set from an outer side of the vehicle body. The detector switching position is set so that the detection result of the lid sensor is switched between an open state and a closed state when the lid passes by the detector switching position. The push lifter switching position is set so that the push lifter is switched from a projected state to a retracted state when the lid passes by the push lifter switching position. The lock switch switching position is set so that the lid lock switch is pushed when the lid reaches the lock switch switching position.

In this structure, when pushed into the vehicle body, the lid sequentially reaches the detector switching position, the push lifter switching position, and the lock switch switching position.

Preferably, in the lid lock device, the push lifter includes a push lifter switching range that includes the push lifter switching position. The push lifter is configured to be switched between the retracted state and the projected state in the push lifter switching range. The lid lock unit includes a locked lid movable range that permits movement of the lid when the lid is locked. The push lifter switching range is set toward the inner side of the vehicle body from the locked lid movable range, and the push lifter switching range is set so as not to overlap with the locked lid movable range.

In this structure, when the lid unlock conditions are not satisfied (identification code not verified), the lid does not reach the push lifter switching range even when the locked lid is pushed. Thus, the state of the push lifter is not switched when the lid is locked.

For example, when the lid is locked, the push lifter is not projected. This limits situations in which the state of the lid and the state of the push lifter differ are not as intended. If such a situation is left unattended, when the user pushes the lid to open the lid, the push lifter would be retracted in a lid unlock state. In this manner, even though the lid is unlocked, the lid would not open because the push lifter is retracted. The above structure resolves such a problem.

Preferably, in the lid lock device, the control unit is configured to lock the lid with the lid lock unit when detecting a situation in which the lid does not switch to an open state over a first determination time from when the lid lock unit unlocks the lid.

As an example, when closing the lid, the lid may be pushed into the vehicle body beyond the detector switching position and the lock switch switching position. However, the lid may be stopped before reaching the push lifter switching position. In this case, the lid is locked and the push lifter remains projected. As a result, when opening the lid the next time, the lid may not open because of the retracted push lifter. Such a problem is resolved by the lid lock device of an embodiment in which the control unit is configured to lock the lid with the lid lock unit when detecting a situation in which the lid does not switch to an open state over a first determination time from when the lid lock unit unlocks the lid.

Alternatively, when the lid is locked, the lid may be pushed into the vehicle body beyond the detector switching position and the push lifter switching position. However, the lid may be stopped before reaching the lock switch switching position. In this case, the push lifter is projected and the lid remains locked. As a result, when opening the lid the next time, the push lifter would be retracted and the lid would not open. Such a problem is also resolved by the lid lock device of an embodiment in which the control unit is configured to lock the lid with the lid lock unit when detecting a situation in which the lid does not switch to an open state over a first determination time from when the lid lock unit unlocks the lid.

Preferably, in the lid lock device, the control unit is configured to determine that lid lock conditions have been satisfied and locks the lid when the identification code has been verified, a closed state of the lid has been detected, and the closed state of the lid has been continuously detected over a second determination time from when the lid lock switch is pushed.

For example, if the detector switching position, the lock switch switching position, and the push lifter switching position are sequentially set from the outer side of the vehicle body, when closing the lid, the lid may be pushed beyond the detector switching position and the lock switch switching position. However, the lid may be stopped before reaching the push lifter switching position. In this case, the lid does not reach the push lifter switching position. Thus, the lid may open with the push lifter returning to the projected state and without switching to the retracted state. In this case, the control unit determines that the lid has not opened with the second determination time. Thus, the lid lock conditions are unsatisfied and the lid remains unlocked.

Preferably, in the lid lock device, a door lock detection unit detects a lock state of a vehicle door. The control unit monitors a first condition and a second condition, the first condition includes detection of a lid unlock state and a closed state of the lid, and the second condition includes switching of a vehicle door to a locked state with the door lock detection unit. The control unit is configured to lock the lid with the lid lock unit when the first and second conditions are satisfied.

For example, the lid may be pushed beyond the detector switching position and the push lifter switching position. However, the lid may be stopped before reaching the lock switch switching position. In this case, the lid lock switch would not be pushed by the lid. Accordingly, the lid would remain unlocked when closed (unlocked and closed state). Even when the lid is in an unlocked and closed state, the user would usually lock the door when leaving the vehicle. Thus, the lid would be locked in cooperation with the locking of the door. This resolves the unlocked and closed state of the lid.

Preferably, in the lid lock device, the control unit stores the detection result of the lid sensor. The control unit determines that one lid lock condition has been satisfied when the detection result of the lid sensor indicates that an open state has switched to a closed state within a fixed time. The control unit determines that one lid unlock condition has been satisfied when the detection result of the lid sensor indicates that a closed state has switched to an open state within a fixed time.

In this structure, a temporal change in the detection result is added to the lid locking conditions and the lid unlocking conditions. This limits unintentional lid locking and lid unlocking.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4A is a schematic cross-sectional view illustrating the movement of the lid in the first embodiment;

FIG. 4B is a partially enlarged view of FIG. 4A;

FIG. 5 is a table illustrating the relationship of a courtesy switching position, a lock switch switching position, and a push lifter switching position in the first embodiment;

FIG. 9 is a table illustrating the relationship of the courtesy switching position, the lock switch switching position, and the push lifter switching position in a second embodiment;

FIGS. 10A and 10B are schematic views illustrating the movable range of a locked lid in a third embodiment and a prior art example, respectively; and FIG. 11 is a timing chart showing ON and OFF states of a lid courtesy switch and a lid lock switch in a fourth embodiment.

DESCRIPTION OF EMBODIMENTS

A lid lock device according to a first embodiment of the present disclosure will now be described. The lid lock device may be installed in a vehicle 1. The vehicle 1 is, for example, a plugin hybrid vehicle.

Figure 1:
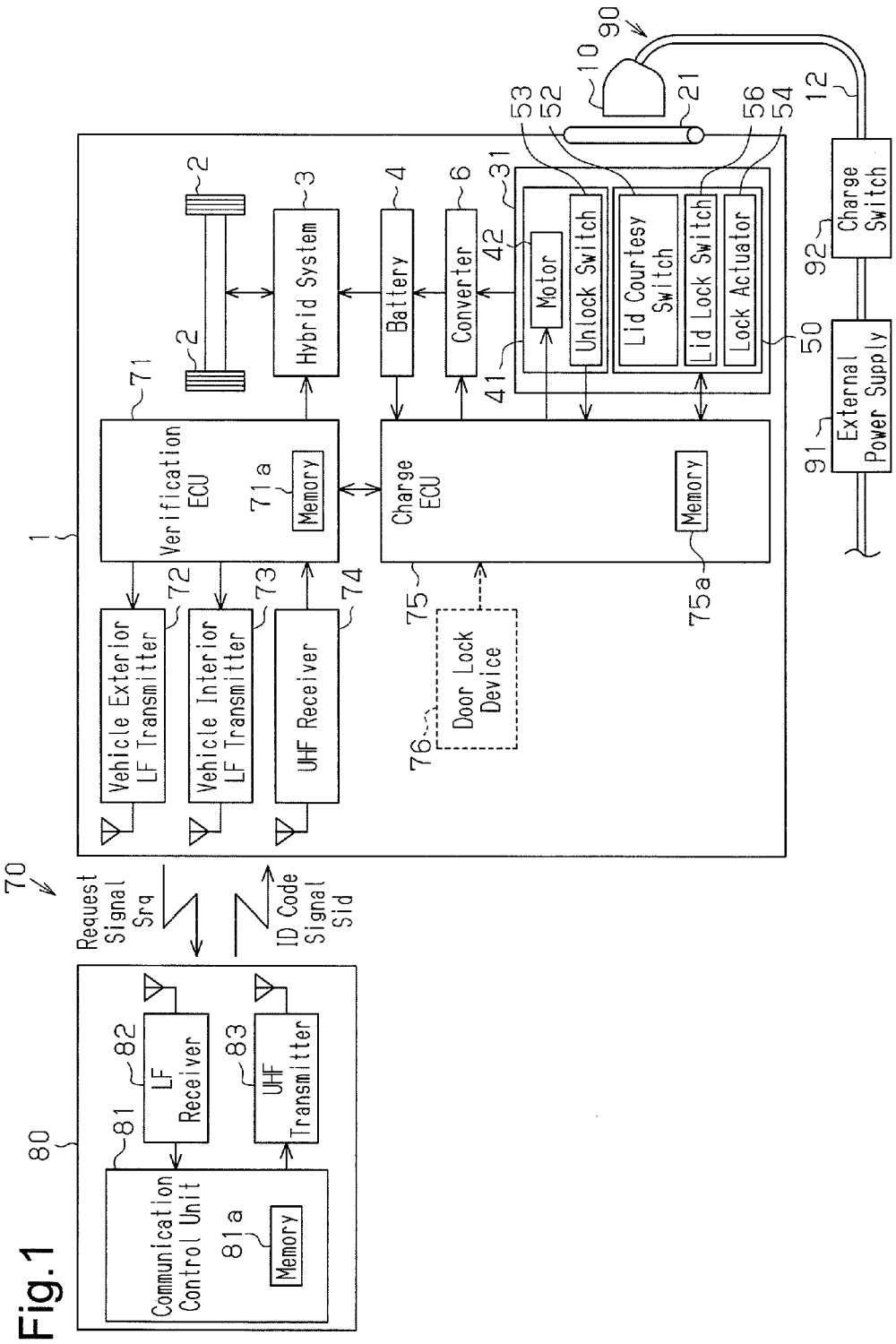
FIG. 1 is a block diagram of a vehicle and an electronic key in a first embodiment.

Referring to FIG. 1, the vehicle 1 includes a hybrid system 3. The hybrid system 3 includes an engine and a motor, which serve as drive sources for drive wheels 2. The hybrid system 3 functions in a mode that mechanically drives the drive wheels 2 with only the power of the engine, a mode that drives the drive wheels 2 with the motor generating electric power using the power of the engine, a mode that drives the drive wheels 2 with both of the engine and the motor, and a mode that drives the drive wheels with only the motor.

A battery 4, which supplies the motor with power, is connected to the hybrid system 3. The battery 4 may be charged by the engine and by an external power supply 91 connected to the vehicle 1.

An electronic key system 70 is installed in the vehicle 1. The electronic key system 70 includes an electronic key 80, which performs radio communication with the vehicle 1. For example, the electronic key system 70 is configured so that the driver who is carrying the authentic electronic key 80 can lock and unlock a door of the vehicle 1 without operating an actual physical key upon completion of a predetermined electronic key verification sequence including the establishment of radio communication.

The vehicle 1 includes a verification electronic control unit (ECU) 71 that verifies an identification (ID) code. The verification ECU 71 includes a memory 71a. The verification ECU 71 is connected to a vehicle exterior low frequency (LF) transmitter 72, a vehicle interior LF transmitter 73, and an ultrahigh frequency (UHF) receiver 74. The vehicle exterior LF transmitter 72 is installed in each door of the vehicle 1 to transmit radio signals on the LF band outside the vehicle 1. The vehicle interior LF transmitter 73 is installed in the vehicle floor or the like to transmit radio signals on the LF band inside the vehicle 1. The UHF receiver 74 is installed in the vehicle 1 to receive radio signals on the UHF band.

The electronic key 80 includes a communication control unit 81. The communication control unit 81 includes a memory 81a that stores an ID code unique to the electronic key 80. The communication control unit 81 is connected to an LF receiver 82, which receives LF band radio signals, and an UHF transmitter 83, which transmits UHF band radio signals in accordance with commands from the communication control unit 81.

The verification ECU 71 intermittently transmits an ID request signal Srq on the LF band from the vehicle exterior LF transmitter 72. When the electronic key 80 enters a vehicle exterior communication area, the electronic key 80 receives an ID request signal Srq via the LF receiver 82. In response to the ID request signal Srq, the communication control unit 81 transmits an ID code signal on the UHF band from the UHF transmitter 83. The ID code signal Sid includes the ID code that is registered to the memory 81a. When the verification ECU 71 receives the ID code signal Sid via the UHF receiver 74, the verification ECU 71 verifies the ID code registered to the memory 71a with the ID code in the ID code signal Sid (referred to as vehicle exterior verification). When the vehicle exterior verification is accomplished, the verification ECU 71 permits or performs locking and unlocking of a vehicle door with a door lock device (not shown).

When vehicle exterior verification is established, upon detection of a series of changes in the vehicle state in which the vehicle door is unlocked and the door subsequently opens, the verification ECU 71 recognizes that the driver has entered the vehicle 1. Then, the verification ECU 71 transmits an ID request signal Srq from the vehicle interior LF transmitter 73 to form a vehicle interior communication area that covers the entire vehicle interior. When the electronic key 80 enters the vehicle interior communication area, the electronic key 80 transmits an ID code signal Sid. When the verification ECU 71 receives the ID code signal Sid via the UHF receiver 74, the verification ECU 71 verifies the ID code in the received ID code signal Sid with the ID code registered to the memory 71a (referred to as vehicle interior verification). When vehicle interior verification is accomplished, the verification ECU 71 permits activation of the hybrid system 3.

As shown in FIG. 1, the vehicle 1 includes a battery 4. The battery 4 may be charged by a plugin type charge system 90. The charge system 90 includes a power plug 10 that is connected by a connection cable 12 to an external power supply 91, which may be a household power supply or a charging station facility. The power plug 10 is connectable to an inlet 31 of the vehicle 1. The vehicle 1 is supplied with AC power from the external power supply 91 through the power plug 10. The connection cable 12 or the power plug 10 includes a charge switch 92. When the power plug 10 is connected to the vehicle 1, the charge switch 92 outputs a charge start signal when activated and a charge end signal when deactivated. The charge start signal or the charge end signal is provided via the power plug 10 to the vehicle 1.

Figure 2:
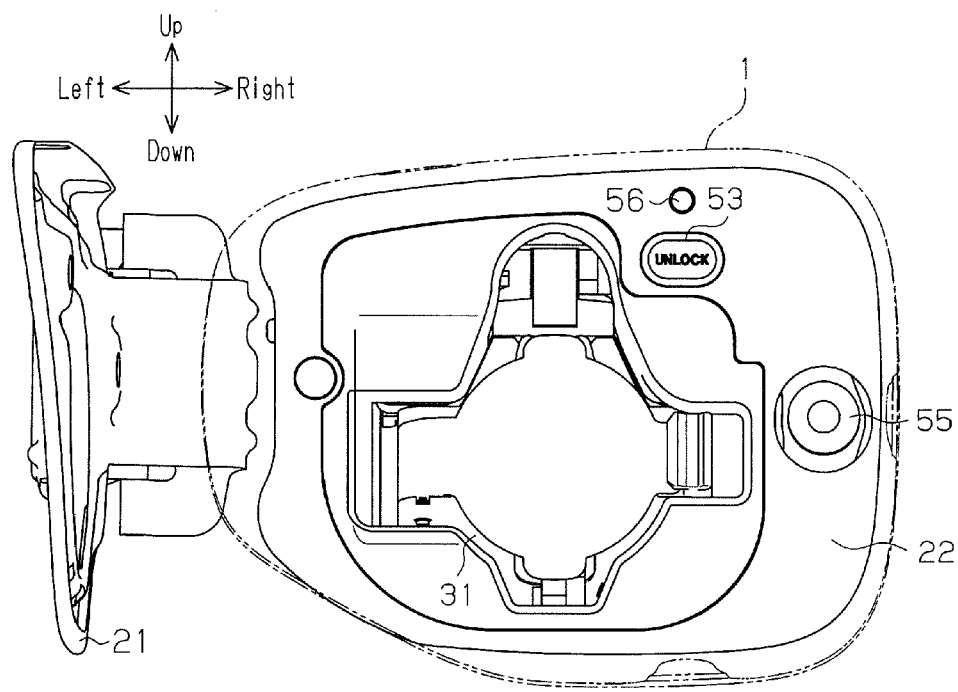
FIG. 2 is a front view of a power supply port in the first embodiment.

FIG. 2 shows a well 22 formed in, for example, an exterior side wall of the vehicle 1. The well 22 may be referred to as the charge port or simply the port. The inlet 31, which is connected to the power plug 10, is arranged in the well 22. Further, a plug unlock switch 53 and a lid lock switch 56 are arranged in the well 22. The lid lock switch 56 is of a push type. Further, the plug unlock switch 53 is of, for example, a push type.

A lid 21 closes the well 22. The lid 21 is, for example, of a hinged type. The inlet 31 is exposed when the lid 21 opens, and the inlet 31 is concealed when the lid 21 closes. The closed lid 21 is substantially flush with the outer wall of the vehicle body.

Referring to FIG. 1, when the power plug 10 is fitted to the inlet 31, the inlet 31 is electrically connected to the power plug 10. A converter 6 converts the AC power from the inlet 31 to DC power and charges the battery 4 with the DC power.

The vehicle 1 includes a charge ECU 75 that controls charging. The charge ECU 75 is configured to communicate with the verification ECU 71 through an in-vehicle local area network (LAN), which is not shown in the drawings. The charge ECU 75 checks the ID verification accomplishment results of the verification ECU 71. For example, based on the connection of signal lines, the charge ECU 75 determines that the power plug 10 has been fitted into the inlet 31.

As shown in FIG. 1, the inlet 31 may include a plug lock device 41, which is electrically connected to the charge ECU 75. The plug lock device 41 includes the plug unlock switch 53 and a motor 42. When the plug unlock switch 53 is pushed, the charge ECU 75 is provided with an unlock request signal. The motor 42 is switched between a lock state in which the motor 42 locks the power plug 10 to the inlet 31 and an unlock state in which the motor 42 allows the power plug 10 to be removed from the inlet 31.

The charge ECU 75 starts charging the battery 4 when three conditions are satisfied. The three conditions are that the power plug 10 has been fitted to the inlet 31, the power plug 10 has been locked, and vehicle exterior ID verification has been accomplished. When these three conditions have all been satisfied, upon receipt of a signal indicating that the charge switch 92 has been activated via the power plug 10 and the inlet 31, the charge ECU 75 starts supplying power to the battery 4 under the control of the converter 6.

When the charge ECU 75 determines that vehicle exterior ID verification has been accomplished and that the plug unlock switch 53 has been pushed, the charge ECU 75 activates the motor 42 and unlocks the power plug 10 from the inlet 31. In this case, the charge ECU 75 stops charging the battery 4 under the control of the converter 6.

Referring to FIG. 1, a lid lock mechanism 50 may be arranged in, for example, the inlet 31. The lid lock mechanism 50 is configured to lock and unlock the lid 21. The lid lock mechanism 50 may include a lid lock unit that automatically opens the lid 21 when the closed lid 21 is pushed into the vehicle 1. For example, the lid lock mechanism 50 includes a lid courtesy switch 52, a lid lock switch 56, and a lock actuator 54.

Referring to FIG. 2, a push lifter 55 is arranged in the well 22 to guide the opening and closing of the lid 21. The push lifter 55 projects toward the outer side. When the lid 21 is closed, the inner surface of the lid 21 contacts the distal end face of the push lifter 55. When the lid 21 opens, the inner surface of the lid 21 is separated from the distal end face of the push lifter 55. The push lifter 55 is switched between a retracted state and a projected state.

When the push lifter 55 is in the projected state, a pushing force may be applied by the inner surface of the lid 21 to the distal end face of the push lifter 55. This resiliently deforms the push lifter 55, which is in the projected state, into the vehicle 1 to a push lifter switching position Ppl (FIG. 5). When the push lifter 55 is released from the pushing force before reaching the push lifter switching position Ppl, the push lifter 55 returns to the projected state. When the lid 21 reaches the push lifter switching position Ppl, the push lifter 55 is switched to and held in the retracted state.

When the push lifter 55 is in the retracted state, a pushing force may be applied by the inner surface of the lid 21 to the distal end face of the push lifter 55. This switches the push lifter 55 from the retracted state to the projected state. When shifting from the retracted position to the projected position, the lid 21 is pushed out of the vehicle 1. This opens the lid 21.

The lid courtesy switch 52 is arranged on or in the vicinity of the basal end face of the push lifter 55. The lid courtesy switch 52 is activated when the lid 21 is located toward the outer side of the vehicle 1 from the courtesy switching position Pco (FIG. 5). Further, the lid courtesy switch 52 is deactivated when the lid 21 is located at the courtesy switching position Pco or toward the inner side of the vehicle 1 from the courtesy switching position Pco. The charge ECU 75 is connected to the lid courtesy switch 52 to determine whether the lid 21 is open or closed from the state of the lid courtesy switch 52.

When the lid 21 is located toward the outer side of the vehicle from the lock switch switching position Pls (FIG. 5), the lid lock switch 56 is not pushed by the lid 21. When a pushing force is applied to the lid 21 from the outer side, the lid 21 is moved toward the inner side of the vehicle 1 from the lock switch switching position Pls. This pushes the lid lock switch 56 with the lid 21. When the lid lock switch 56 is pushed, the charge ECU 75 is provided with a lock request signal.

The lock actuator 54 moves a lock pin 23 (refer to FIG. 3) between a lock position and an unlock position under the control of the charge ECU 75. When the lid 21 is closed and the lock pin 23 is located at the lock position, the lock pin 23 is fitted into an elongated hole 24a of a striker 24 to prohibit opening of the lid 21 (lid lock state). When the lock pin 23 is located at the unlock position, the lock pin 23 is removed from the elongated hole 24a of the striker 24 to permit opening of the lid 21 (lid unlock state).

Lid lock conditions for locking the lid 21 will now be described. The lid lock conditions include the ID verification result, the state of the lid lock switch 56, and the open duration of the lid 21. Referring to the solid lines in FIG. 6, the charge ECU 75 locks the lid 21 under a situation in which ID verification has been accomplished when the lid 21 is continuously closed over a second determination time T2 (e.g., one second) from when the lid lock switch 56 is deactivated thereby satisfying the lid lock conditions.

Figure 6:
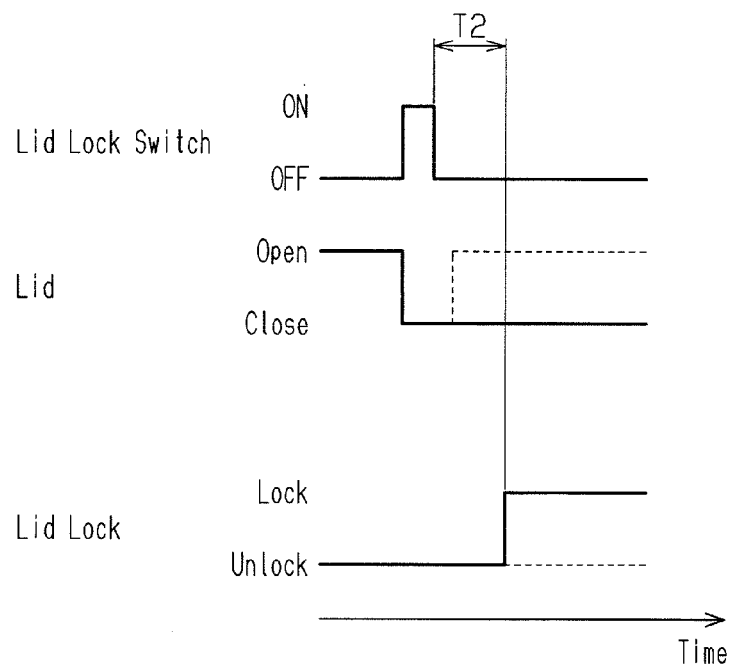
FIG. 6 is a timing chart showing the states of a lock switch, a lid, and a lid lock when lid locking is performed.

Referring to the broken lines in FIG. 6, under a situation in which ID verification has been accomplished, if the lid 21 opens before the second determination time T2 elapses from when the lid lock switch 56 is deactivated, the lid lock conditions are not satisfied. In this case, the charge ECU 75 keeps the lid 21 unlocked.

Lid unlock conditions will now be described. If the lid lock switch 56 is deactivated when the lid 21 is locked under a situation in which ID verification has been accomplished, the charge ECU 75 determines that the lid unlock conditions have been satisfied and unlocks the lid 21.

A fail-safe control will now be described. The fail safe control is executed so that the lid 21 is not left unattended when unlocked. For example, as shown by the broken lines in FIG. 7, the charge ECU 75 unlocks the lid 21 when the lid unlock conditions are satisfied and then locks the lid 21 when detecting that the lid 21 has remained closed over a first determination time T1.

Figure 7:
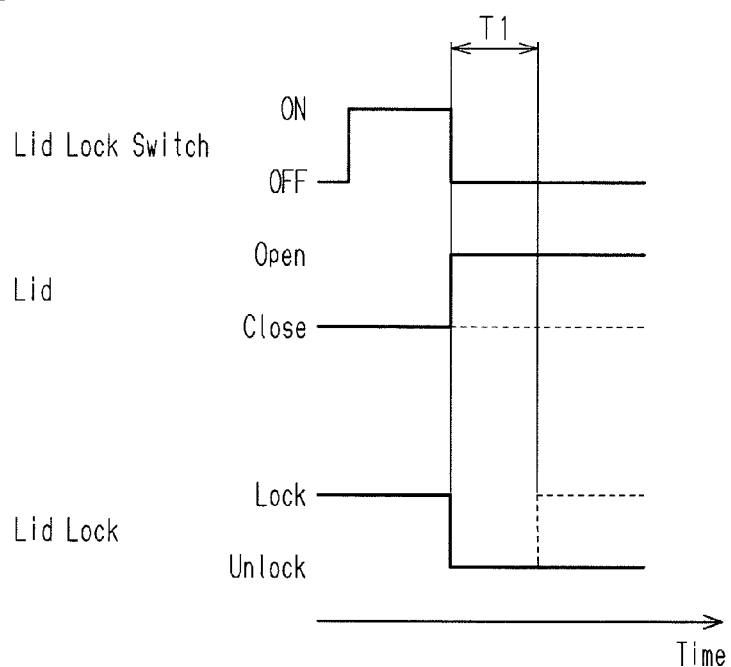
FIG. 7 is a timing chart illustrating the states of the lock switch, the lid, and the lid lock when a fail-safe control is executed.

As shown by the solid lines in FIG. 7, the charge ECU 75 keeps the lid 21 unlocked when detecting that the lid 21 has opened before the first determination period T1 elapses from when the lid 21 is unlocked. The first determination time T1 is one example of a fail-safe specified time or an unlock unattended determination time.

Referring to FIGS. 4A and 4B, the lid 21 is movable is a range from position P1 to position P4. Position P1 may be referred to as an outermost position. Position P4 may be referred to as an innermost position. As shown in FIG. 5, the courtesy switching position Pco is set between positions P1 and P2. The lock switch switching position Pls is set between positions P2 and P3. The push lifter switching position Ppl is set between positions P3 and P4.

Figure 8:
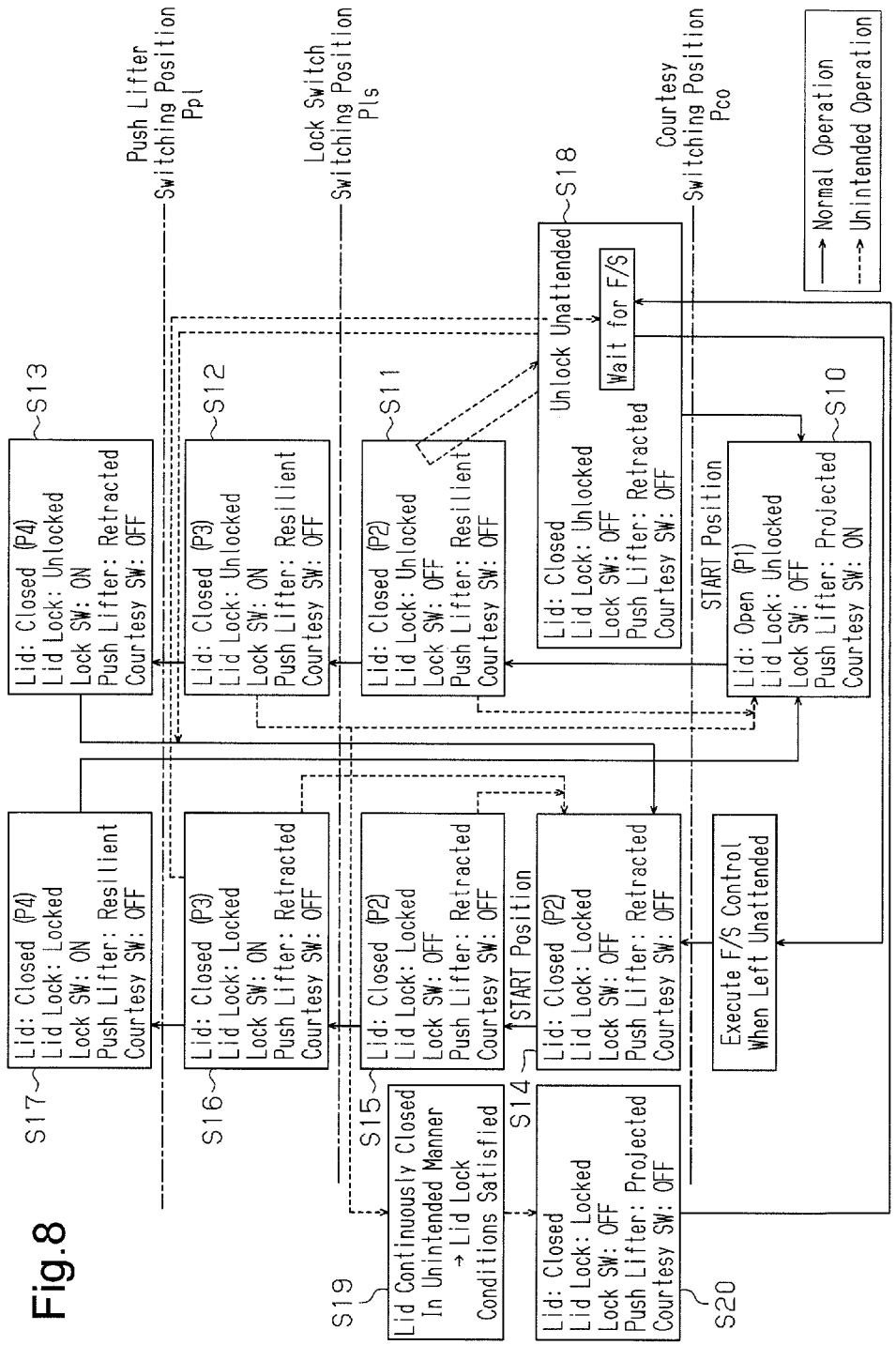
FIG. 8 is a chart illustrating changes in the state of the lid lock device in the first embodiment.

The operations of the lid courtesy switch 52, the lid lock switch 56, and the push lifter 55 will now be described with reference to FIG. 8.

An example in which the lid 21 is normally operated (states S10 to S17) will now be described.

In state S10, the lid 21 is open (position P1). Under this situation, the lid 21 is unlocked, the lid lock switch 56 is deactivated, the lid courtesy switch 52 is activated, and the push lifter 55 is projected. From state S10, the lid 21 is pushed in the close direction beyond the courtesy switching position Pco to position P2, where the lid lock device is shifted to state S11.

In state S11, the lid 21 is closed and the lid courtesy switch 52 is deactivated. From state S11, the lid 21 is pushed into the vehicle 1. This resiliently deforms the push lifter 55 with the lid 21. When the push lifter 55 is resiliently deformed, the user releases the lid 21. This returns the push lifter 55 to the projected state and opens the lid 21.

When the lid 21 moves beyond the lock switch switching position Pls until reaching position P3, the lid lock device is shifted to state S12. In state S12, the lid lock switch 56 is activated. Further, in state S12, when the user releases the lid 21 like in step S11 before the second determination time T2 elapses, the push lifter 55 returns to the projected state. This opens the lid 21.

From state S12, when the lid 21 is further pushed into the vehicle 1 beyond the push lifter switching position Ppl until reaching position P4, the lid lock device shifts to state S13. In state S13, the push lifter 5 is switched from state S12 to a retracted state. The push lifter 55 is maintained in the retracted state, and the lid 21 remains closed. When the user releases the lid 21 so that force no longer acts on the lid 21, the lid lock switch 56 is turned off.

When the lid 21 is unlocked, ID verification has been accomplished, and the lid 21 has been continuously closed over the second determination time T2 (e.g., one second) from when the lid lock switch 56 is deactivated, the charge ECU 75 determines that the lid lock conditions have been satisfied and locks the lid 21. This shifts the lid lock device from state S13 to state S14, which is a lid lock state in which the lid 21 is closed. In the lid lock state, the lid lock switch 56 is deactivated, the lid courtesy switch 52 is deactivated, and the push lifter 55 is retracted. The lid 21 is pushed into the vehicle 1 to resiliently deform the push lifter 55 (state S15) and move beyond the lock switch switching position Pls until reaching position P3. This shifts the lid lock device from state S14 to state S16.

In state S16, the lid lock switch 56 is activated. When the lid 21 is further pushed into the vehicle 1 beyond the push lifter switching position Ppl until reaching position P4, the lid lock device is shifted from state S16 to state S17.

In state S17, the push lifter 55 is switched from the retracted state to a resilient state. Then, when the user releases the lid 21, the lid lock switch 56 is turned off. When the lid 21 is locked, ID verification has been accomplished, and the lid lock switch 56 is deactivated, the charge ECU 75 unlocks the lid 21. This returns the push lifter 55 to a projected state and opens the lid 21. As a result, the lid lock device shifts from state S17 to state S10. State S10 is a lid unlock state in which the lid 21 is open. In the lid unlock state, the lid lock switch 56 is deactivated, the lid courtesy switch 52 is activated, and the push lifter 55 is projected.

An example in which an abnormal operation is performed on the lid 21 will now be described.

When the lid 21 is pushed from a closed state (state S14) to position P3 (not position P4), the lid lock device shifts to state S16. In this case, the push lifter 55 remains retracted, and the lid 21 may be unlocked (state S18). State S18 results in the lid lock state and the state of the push lifter 55 differing from the intended situation. For example, even though the lid 21 has been unlocked, the lid 21 remains closed (unlocked and closed).

To resolve such a problem, the charge ECU 75 executes the fail-safe control. More specifically, the charge ECU 75 locks the lid 21 if the lid 21 does not open within the first determination time T1 from when the lid 21 is unlocked. This shifts the lid lock device to state S14 to resolve the unlocked and closed state.

In state S12, when the user releases the lid 21, the push lifter 55 returns to the projected state. This returns the vehicle to state S10. However, if the user keeps the lid 21 closed with his or her hand (state S19), the charge ECU 75 may determine that the lid lock conditions have been satisfied and lock the lid 21. This results in the lid lock state and the state of the push lifter 55 differing from the intended situation (state S20).

When such a problem remains unattended, if the user pushes the lid 21 to position P4 to open the lid 21, the push lifter 55 is retracted and the lid 21 is unlocked. Thus, in the same manner as state S18, if the push lifter 55 is retracted even though the lid 21 is unlocked, the lid 21 does not open and the lid 21 is in an unlocked and closed state.

When the user pushes the lid 21 in the open state (state S10) to position P3 and then releases the lid 21, the push lifter 55 returns to the projected state (state S10). In this case, when the charge ECU 75 detects that the lid 21 has opened before the second determination time T2 elapses from when the lid lock switch 56 is deactivated, the charge ECU 75 determines that the lid lock conditions are not satisfied. Accordingly, the charge ECU 75 keeps the lid 21 unlocked. This limits locking of the lid 21 before reaching position P4 (shifting to state S20).

The lid lock device includes the lid lock mechanism 50 and the charge ECU 75. The charge ECU 75 is one example of a control unit. The verification ECU 71 is one example of a verification unit. The lid courtesy switch 52 is one example of a lid sensor. The lock pin 23, the striker 24, and the lock actuator 54 form one example of a lid lock unit.

The advantages of the embodiment described above will now be described.

(1) The charge ECU 75 switches the lid 21 between a locked state and an unlocked state when determining that the lid lock switch 56 has been pushed under a situation in which ID verification has been accomplished and the lid 21 is recognized as being closed through the lid courtesy switch 52. This allows the user to switch only the lid lock state just by pushing the lid 21 without cooperation with the locking and unlocking of the vehicle doors. This improves convenience.

(2) When the lid 21 is pushed into the vehicle 1, the lid 21 sequentially reaches the courtesy switching position Pco, the lock switch switching position Pls, and the push lifter switching position Ppl.

(3) For example, the closed lid 21 may be pushed into the vehicle 1 beyond the courtesy switching position Pco and the lock switch switching position Pls but without reaching the push lifter switching position Ppl. This shifts the lid 21 to a lock state while the push lifter 55 remains in the projected state. This results in the lid lock state and the retracted state of the push lifter 55 differing from the intended situation in state S20. When such a problem remains unattended, the lid may not open due to the retraction of the push lifter 55 regardless of the lid unlock state. Such a problem may occur if the lid 21 is pushed to only P3 when opening the lid 21.

In the above structure, when determining that the lid 21 has not been opened within the first determination time T1 after switching to the lid unlock state, the charge ECU 75 determines that there is a difference from the intended situation and switches to the lid lock state. This solves the above problem.

(4) For example, when closing the lid 21, the lid 21 may be moved beyond the courtesy switching position Pco and the lock switch switching position Pls without reaching the push lifter switching position Ppl. In this case, the lid 21 does not reach the push lifter switching position Ppl. Thus, the push lifter 55 returns to the projected state and opens the lid 21. Accordingly, the charge ECU 75 determines that the lid 21 has opened when the second determination time T2 elapses from when the lid lock switch 56 is released from a pushing force. Thus, the lid lock conditions are not satisfied, and the lid unlock state is maintained. This limits the occurrence of unintended situations.

A second embodiment of a lid lock device will now be described with reference to FIG. 9. The description will focus on differences from the first embodiment.

As shown in FIG. 9, the courtesy switching position Pco is set between positions P1 and P2, the push lifter switching position Ppl is set between positions P2 and P3, and the lock switch switching position Pls is set between positions P3 and P4.

As shown by the broken lines in FIG. 1, a door lock device 76 is electrically connected to the charge ECU 75. The charge ECU 75 recognizes the lock state of a vehicle door through the door lock device 76. The door lock device 76 is one example of a door lock detection unit.

In the second embodiment, a further factor is added to the lid lock conditions of the first embodiment. Specifically, under a lid unlock state, when the charge ECU 75 determines that the lid 21 is closed with the lid courtesy switch 52 and that the vehicle door has been locked with the door lock device 76, the charge ECU 75 determines that the lid lock conditions have been satisfied and switches the lid 21 to the lock state.

Thus, even when the lid 21 is unlocked and closed (state S18 of FIG. 8), the user usually locks the vehicle door when leaving the vehicle 1. The lid 21 is locked in cooperation with the locking of the vehicle door. Accordingly, a problem in which the lid 21 is unlocked and closed is resolved within a short period.

(5) After the user pushes the open lid 21 to position P3 and releases the lid 21, the push lifter 55 is retracted. However, the lid lock switch 56 is not pushed. Thus, the lid 21 remains closed in the lid unlock state (unlocked and closed state). Even in the lid unlock and closed state, the user locks the vehicle door when leaving the vehicle 1. The lid 21 is locked in cooperation with the locking. This resolves the lid unlock and closed state.

(6) When the lid 21 is pushed into the vehicle 1, the lid 21 sequentially reaches the courtesy switching position Pco, the push lifter switching position Ppl, and the lock switch switching position Pls. When the lid 21 is in the lid lock state and pushed into the vehicle 1, the lid 21 may move beyond the courtesy switching position Pco and the push lifter switching position Ppl but not reach the lock switch switching position Pls. In this case, the push lifter 55 is projected in the lid lock state. Thus, when the lid 21 opens the next time, the push lifter 55 is retracted and the lid 21 may not open. In this respect, in the second embodiment, when the charge ECU 75 determines that the lid 21 has not opened within the first determination time T1 after the lid 21 is unlocked, the charge ECU 75 determines that an unintended situation has occurred and locks the lid 21. This resolves such a problem.

(7) The second embodiment is configured under the assumption that controls of the first embodiment (fail-safe control etc.) are executed. This resolves a lid unlock and closed state regardless of the positional relationship of the lock switch switching position Pls and the push lifter switching position Ppl.

More specifically, when the lock switch switching position Pls is located further to the outer side of the vehicle 1 than the push lifter switching position Ppl, the fail-safe control limits the occurrence of unintended situations as described above. Further, when the lock switch switching position Pls is located further to the inner side of the vehicle 1 than the push lifter switching position Ppl, cooperation with the locking and unlocking of the vehicle door like in the second embodiment resolves a lid unlock and closed state.

The two positions Pls and Ppl need to be set within a slight movement distance of the lid 21. Thus, accurate setting of the two positions Pls and Ppl is difficult. In the second embodiment, even when reversing the two positions Pls and Ppl, the lid unlock and closed state may be resolved. This allows for the lid lock mechanism 50 to be further simplified.

A third embodiment of a lid lock device will now be described with reference to FIG. 10. The description will focus on differences from the first embodiment.

Figure 3:
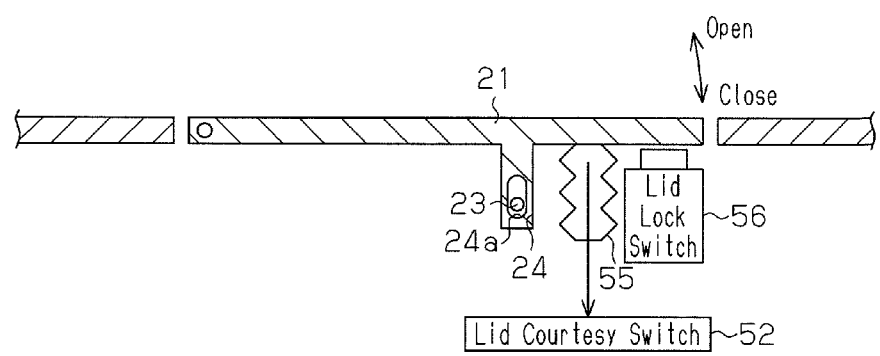
FIG. 3 is a schematic diagram of a lid lock device in the first embodiment.

As shown in FIG. 3, in a lid lock state, the lock pin 23 is movable in the elongated hole 24a of the striker 24. Thus, as shown in FIGS. 10A and 10B, even in the lid lock state, the lid 21 is movable in a locked lid movable range Lra.

As shown in FIG. 10B, in a prior art example, a push lifter switching range Lpl, in which the push lifter 55 may be switched between a retracted state and a projected state, conforms to or partially overlaps with the locked lid movable range Lra. The push lifter switching position Ppl is set anywhere in the push lifter switching range Lpl. The location of the push lifter switching position Ppl varies within the push lifter switching range Lpl due to the accuracy for setting the position of the push lifter 55. In the prior art example, when ID verification has not been accomplished and the lid 21 is in a lock state, the pushing of the lid 21 switches the state of the push lifter 55. This may result in the lid lock state and the state of the push lifter 5 differing from the intended situation (state S18 in FIG. 8) as described in FIG. 8.

In this regard, in the third embodiment, as shown in FIG. 10A, the push lifter switching range Lpl is set further to the inner side of the vehicle 1 than the locked lid movable range Lra. Additionally, the push lifter switching range Lpl and the locked lid movable range Lra are set so as not to overlap each other.

Thus, in a lid lock state under a situation in which ID verification has not been accomplished, the state of the push lifter 55 is not switched even when the lid 21 is pushed. This limits the occurrence of unintended situations of the lid lock state and the state of the push lifter 55.

The operation of the third embodiment will now be described.

When the user pushes the closed lid 21 into the vehicle 1, as the lid 21 reaches an activation switching range of the lid lock switch 56, the lid lock switch 56 is activated in the same manner as the first embodiment. When the charge ECU 75 recognizes that the lid lock switch 56 has been activated, the charge ECU 75 switches the lid 21 to the unlock state. In this case, unlike the first embodiment, the lid 21 is not in the push lifter switching range Lpl. Thus, the push lifter 55 is not projected.

When shifting to the lid unlock state, the lid 21 may reach the push lifter switching range Lpl. Thus, the user pushes the lid 21 again to the push lifter switching range Lpl. This switches the push lifter 55 from the retracted state to a resilient state, and the resilient force of the push lifter opens the lid 21.

As described above, in the third embodiment, the lid 21 may be opened by successively pushing the lid 21 twice.

The third embodiment has the following advantage.

(8) When the lid unlock conditions are not satisfied (ID code verification unaccomplished), the lid 21, which is in a lid lock state, does not reach the push lifter switching range Lpl even if the lid 21 is pushed. Thus, the state of the push lifter 55 does not change.

This limits the occurrence of unintended situations such as the push lifter 55 being projected in the lid lock state or the push lifter 55 being retracted in the lid unlock state.

A fourth embodiment of a lid lock device will now be described with reference to FIG. 11.

As shown in FIG. 11, when the lid 21 is closed, the lid courtesy switch 52 is deactivated. Then, the lid lock switch 56 is activated over a slight period of time. Further, when the lid 21 opens, the lid lock switch 56 is activated over a slight period of time. Then, the lid courtesy switch 52 is activated.

In the fourth embodiment, the charge ECU 75 stores the detection result of the lid courtesy switch 52 over a fixed time Ta. For example, at time t11 in FIG. 11, the charge ECU 75 recognizes the detection result of the lid courtesy switch 52 (activated state) and stores the detection result in the memory 75a. At time t2, which is when the fixed time Ta elapses from time t11, the charge ECU 75 recognizes the detection result of the lid courtesy switch 52 (deactivated state) and stores the detection result in the memory 75a.

Further, at time t3 in FIG. 11, the charge ECU 75 recognizes the detection result of the lid courtesy switch 52 (deactivated state) and stores the detection result in the memory 75a. At time t4, which is when the fixed time Ta elapses from time t3, the charge ECU 75 recognizes the detection result of the lid courtesy switch 52 (deactivated state) and stores the detection result in the memory 75a.

A condition in which the detection result of the lid courtesy switch 52 stored in the memory 75a is an activated state and the present detection result of the lid courtesy switch 52 is a deactivated state is added to the lid lock conditions of the charge ECU 75 in the above embodiment. The added condition is satisfied at time t2 in FIG. 11. Thus, one of the lid lock conditions is satisfied. The added condition is not satisfied at time t4. This prevents erroneous lid locking.

Further, a condition in which the detection result of the lid courtesy switch 52 stored in the memory 75a is a deactivated state and the present detection result of the lid courtesy switch 52 is an activated state is added to the lid lock conditions of the charge ECU 75 in the above embodiment. The added condition is satisfied at time t4 in FIG. 11. Thus, one of the lid lock conditions is satisfied. The added condition is not satisfied at time t2. This prevents erroneous lid unlocking.

The fourth embodiment has the following advantage.

(9) As shown in FIG. 11, regardless of whether the lid 21 is open or closed, the lid lock switch 56 is activated over a slight period of time when the lid courtesy switch 52 is deactivated. Thus, it cannot be determined whether the user is opening or closing the lid 21 from only the activation and deactivation of the lid courtesy switch 52 and the lid lock switch 56 at certain timings. Thus, in the fourth embodiment, temporal changes in the activation and deactivation of the lid courtesy switch 52 is checked and added to the lid unlock conditions and the lid lock conditions.

More specifically, the charge ECU 75 stores the detection result of the lid courtesy switch 52 in each fixed time Ta. Then, the charge ECU 75 adds, to the lid lock conditions, the detection result of the lid courtesy switch 52 stored in the memory 75a being an activated state and the present detection result of the lid courtesy switch 52 being a deactivated state. Further, the charge ECU 75, adds to the lid unlock conditions, the detection result of the lid courtesy switch 52 stored in the memory 75a being a deactivated state and the present detection result of the lid courtesy switch 52 being an activated state. This limits lid locking and lid unlocking against the intentions of the user.

It should be apparent to those skilled in the art that the present invention may be embodied in many other specific forms without departing from the spirit or scope of the invention. Particularly, it should be understood that the present invention may be embodied in the following forms.

In the second embodiment, the lid 21 may be locked in cooperation with the locking of the vehicle door. The lid 21 may also be unlocked in cooperation with the unlocking of the vehicle door.

In the illustrated embodiments, the vehicle 1 is a battery-powered car such as a plugin hybrid vehicle or an electric vehicle. However, the vehicle 1 may be an engine-powered car such as a gasoline engine vehicle. In this case, the lid may be a fuel lid.

The lid lock switch 56 and the plug unlock switch 53 may be integrated into a single switch. For example, the single switch functions as an unlock switch when the power plug 10 is connected to the inlet 31. Otherwise, the single switch functions as a lid lock switch.

The fail-safe control may be omitted from the first embodiment. When the lid lock switch 56 is deactivated under a situation in which ID verification has been accomplished, the charge ECU 75 may readily lock the lid 21 without monitoring the close state of the lid 21 over the second determination time T2. In this case, the user needs to properly move the lid 21 to position P4.

Instead of starting the measurement of the second determination time T2 from when the lid lock switch 56 is deactivated, the charge ECU 75 may start measuring the second determination time T2 from when the lid lock switch 56 is activated.

The charge ECU 75 may unlock the lid 21 when the lid lock switch 56 is deactivated.

In some embodiments, the charge ECU 75 may solely function as a controller or be integrated with the verification ECU 71 to function as a controller. The controller includes computer-readable instructions to be executed by the controller. In some embodiments, the instructions may be stored in a computer-readable storage device, such as a magnetic disk or an optical disc, coupled to, accessed by, or included in the controller. The memories 71a and 75a may serve as a computer-readable storage device.

The present examples and embodiments are to be considered as illustrative and not restrictive, and the invention is not to be limited to the details given herein, but may be modified within the scope and equivalence of the appended claims.

The invention claimed is:

1. A lid lock device for use with a lid that is movable in a moveable range from an outermost position to an innermost position and closes a port of a vehicle body, the lid lock device comprising:
   a push lifter arranged to be pushed by the lid and configured to be alternately switched between a projected state and a retracted state whenever the lid is pushed from an outer side to an inner side of the vehicle body so that the lid passes by a predetermined push lifter switching position, wherein the push lifter is configured to urge the lid to the open position when switched from the retracted state to the projected state, and wherein the push lifter, when not being pushed, is held in a switched state;
   a lid lock switch configured to be directly or indirectly pushed by an inner surface of the lid when the lid is located at or inside of a predetermined lock switch switching position to detect that the lid, when located at the closed position, has been pushed from an outer side;
   a lid sensor that detects whether the lid is open or closed, wherein the lid sensor is configured to detect that the lid is closed when the lid is located at or inside of a predetermined detector switching position, and wherein the lid sensor is configured to detect that the lid is open when the lid is located outside the predetermined detector switching position;
   a lid lock unit controlled to lock the lid when the lid is closed;
   a verification unit configured to verify an identification code transmitted through radio communication from an electronic key that serves as a portable device; and
   a control unit configured to control the lid lock unit in accordance with a verification result of the verification unit, a detection result of the lid sensor, and a detection result of the lid lock switch,
   wherein under a situation in which the verification result of the verification unit indicates that the identification code has been verified and the detection result of the lid sensor indicates that the lid is closed, the control unit activates the lid lock unit to switch the lid between a locked state and an unlocked state when the lid lock switch detects that the closed lid has been pushed, wherein the predetermined detector switching position, the predetermined lock switch switching position, and the predetermined push lifter switching position are set at mutually different positions in the movable range from the outermost position to the innermost position of the lid, wherein the push lifter includes a predetermined push lifter switching range that includes the predetermined push lifter switching position, wherein the push lifter is configured to be switched between the retracted state and the projected state in the predetermined push lifter switching range, wherein the lid lock unit includes a locked lid movable range that permits movement of the lid when the lid is locked, and wherein the predetermined push lifter switching range is set toward the inner side of the vehicle body from the locked lid movable range, and the predetermined push lifter switching range is set so as not to overlap with the locked lid movable range.

2. The lid lock device according to claim 1, wherein:

the predetermined detector switching position, the predetermined lock switch switching position, and the predetermined push lifter switching position are sequentially set from an outer side of the vehicle body;

the predetermined detector switching position is set so that the detection result of the lid sensor is switched between an open state and a closed state when the lid passes by the predetermined detector switching position;

the predetermined lock switch switching position is set so that the lid lock switch is pushed when the lid reaches the predetermined lock switch switching position; and the predetermined push lifter switching position is set so that the push lifter is switched from the projected state to the retracted state when the lid is pushed from the outer side to the inner side of the vehicle body so that the lid passes by the predetermined push lifter switching position.

3. The lid lock device according to claim 2, wherein the control unit is configured to lock the lid with the lid lock unit when detecting a situation in which the lid does not switch to an open state over a first determination time from when the lid lock unit unlocks the lid.

4. The lid lock device according to claim 2, wherein the control unit is configured to determine that lid lock conditions have been satisfied and locks the lid when the identification code has been verified, a closed state of the lid has been detected, and the closed state of the lid has been continuously detected over a second determination time from when the lid lock switch is pushed.

5. The lid lock device according to claim 1, wherein:

the predetermined detector switching position, the predetermined push lifter switching position, and the predetermined lock switch switching position are sequentially set from an outer side of the vehicle body;

the predetermined detector switching position is set so that the detection result of the lid sensor is switched between an open state and a closed state when the lid passes by the predetermined detector switching position;

the predetermined push lifter switching position is set so that the push lifter is switched from the projected state to the retracted state when the lid is pushed from the outer side to the inner side of the vehicle body so that the lid passes by the predetermined push lifter switching position; and the predetermined lock switch switching position is set so that the lid lock switch is pushed when the lid reaches the predetermined lock switch switching position.

6. The lid lock device according to claim 1, characterized by:

a door lock detection unit that detects a lock state of a vehicle door;

wherein the control unit monitors a first condition and a second condition, the first condition includes detection of a lid unlock state and a closed state of the lid, and the second condition includes switching of a vehicle door to a locked state with the door lock detection unit; and the control unit is configured to lock the lid with the lid lock unit when the first and second conditions are satisfied.

7. The lid lock device according to claim 1, wherein:

the control unit stores the detection result of the lid sensor;

the control unit determines that one lid lock condition has been satisfied when the detection result of the lid sensor indicates that an open state has switched to a closed state within a fixed time; and the control unit determines that one lid unlock condition has been satisfied when the detection result of the lid sensor indicates that a closed state has switched to an open state within a fixed time.

8. A system installed in a vehicle including a lid that closes a port of a vehicle body, the system comprising:

an electronic key serving as a portable device that transmits an identification code through radio communication; and the lid lock device according to claim 1.

9. A vehicle comprising:

a lid that closes a port of a vehicle body; and the lid lock device according to claim 1.

10. A non-transitory computer-readable medium having stored thereon instructions that cause a computing system to execute a method, the instructions comprising:

a first set of instructions configured to verify an identification code transmitted through radio communication from an electronic key;

a second set of instructions configured to receive a verification result of the identification code;

a third set of instructions configured to receive, from a lid sensor, a detection result indicating whether or not a lid, which is movable in a movable range from an outermost position to an innermost position and closes a port of a vehicle body, is open, wherein a push lifter arranged to be pushed by the lid and configured to be alternately switched between a projected state and a retracted state whenever the lid is pushed from an outer side to an inner side of the vehicle body so that the lid passes by a predetermined push lifter switching position, wherein the push lifter is configured to urge the lid to the open position when switched from the retracted state to the projected state, wherein the push lifter, when not being pushed, is held in a switched state, wherein the lid sensor is configured to detect that the lid is closed when the lid is located at or inside of a predetermined detector switching position, and wherein the lid sensor is configured to detect that the lid is open when the lid is located outside the predetermined detector switching position;

a fourth set of instructions configured to receive a detection result from a lid lock switch that is configured to be directly or indirectly pushed by an inner surface of the lid when the lid is located at or inside of a predetermined lock switch switching position, wherein the detection result from the lid lock switch indicates whether the lid, when located at the closed position, has been pushed from the outer side; and a fifth set of instructions configured, under a situation in which the verification result indicates that the identification code has been verified and the detection result of the lid sensor indicates that the lid is in a closed state, to activate a lid lock unit to switch the lid between a locked state and an unlocked state when a detection result of the lid lock switch indicates that the closed lid has been pushed, wherein the predetermined detector switching position, the predetermined lock switch switching position, and the predetermined push lifter switching position are set at mutually different positions in the movable range from the outermost position to the innermost position of the lid, wherein the push lifter includes a predetermined push lifter switching range that includes the predetermined push lifter switching position, wherein the push lifter is configured to be switched between the retracted state and the projected state in the predetermined push lifter switching range, wherein the lid lock unit includes a locked lid movable range that permits movement of the lid when the lid is locked, and wherein the predetermined push lifter switching range is set toward the inner side of the vehicle body from the locked lid movable range, and the predetermined push lifter switching range is set so as not to overlap with the locked lid movable range.

11. A controller of a lid lock device for locking a lid that closes a port of a vehicle body, the controller comprising:

the non-transitory computer-readable medium according to claim 10.

* * * * *